(12) United States Patent
Conrad et al.

(10) Patent No.: US 9,562,989 B2
(45) Date of Patent: Feb. 7, 2017

(54) ROTATIONAL INDEXING TO OPTIMIZE SENSING VOLUME OF A NUCLEAR MAGNETIC RESONANCE LOGGING TOOL

(75) Inventors: Christopher J. Conrad, Glen Mills, PA (US); Rebecca C. Jachmann, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 543 days.

(21) Appl. No.: 14/123,295

(22) PCT Filed: Jun. 7, 2011

(86) PCT No.: PCT/US2011/039503
§ 371 (c)(1),
(2), (4) Date: Dec. 2, 2013

(87) PCT Pub. No.: WO2012/170014
PCT Pub. Date: Dec. 13, 2012

(65) Prior Publication Data
US 2014/0117984 A1    May 1, 2014

(51) Int. Cl.
*G01V 3/00* (2006.01)
*G01V 3/32* (2006.01)

(52) U.S. Cl.
CPC ..................... *G01V 3/32* (2013.01)

(58) Field of Classification Search
USPC ....................................................... 324/303
See application file for complete search history.

(56) References Cited

U.S. PATENT DOCUMENTS 4,710,713 A    12/1987 Strikman
4,717,876 A    1/1988 Masi et al.
(Continued)

FOREIGN PATENT DOCUMENTS

EP    0649035    3/1997
EP    0581666    10/1997
(Continued)

OTHER PUBLICATIONS

PCT International Search Report and Written Opinion, dated Oct. 3, 2011, Appl No. PCT/US2011/039503, "Rotational Indexing to Optimize Sensing Volume of a Nuclear Magnetic Resonance Logging Tool", filed Jun. 7, 2011, 8 pgs.
(Continued)

*Primary Examiner* — Rodney Fuller
(74) *Attorney, Agent, or Firm* — Iselin Law PLLC; Alan Bryson

(57) ABSTRACT

A nuclear magnetic resonance (NMR) logging tool assembly method that employs rotational indexing to optimize the sensing volume. At least some embodiments include establishing an initial arrangement of the permanent magnets and marking each magnet to indicate their relative rotational orientations in the initial arrangement. Thereafter a series of magnetic field measurements and individual magnet rotations are performed to improve the uniformity of the magnetic field in the sensing volume. Once a satisfactory arrangement has been found, the magnets may be secured together and an antenna array installed along with the electronics for performing relaxation time measurements and providing logs of formation properties that can be derived therefrom, such as porosity, permeability, density, rock type, fluid type, etc. The tool may be packaged as a wireline sonde, a tubing-conveyed logging tool, or a logging while drilling (LWD) tool.

20 Claims, 6 Drawing Sheets

(56) References Cited

U.S. PATENT DOCUMENTS

| | | | |
|---|---|---|---|
| 4,717,877 A | | 1/1988 | Taicher et al. |
| 4,717,878 A | | 1/1988 | Taicher et al. |
| 4,758,813 A | * | 7/1988 | Holsinger ............. G01R 33/383 29/599 |
| 4,832,666 A | | 5/1989 | Henderson |
| 4,933,638 A | | 6/1990 | Kleinberg et al. |
| 4,939,648 A | | 7/1990 | O'Neill et al. |
| 5,055,787 A | | 10/1991 | Kleinberg et al. |
| 5,055,788 A | | 10/1991 | Kleinberg et al. |
| 5,063,934 A | * | 11/1991 | Rapoport ............. G01R 33/383 324/321 |
| 5,212,447 A | | 5/1993 | Paltiel |
| 5,280,243 A | | 1/1994 | Miller |
| 5,309,098 A | | 5/1994 | Coates et al. |
| 5,412,320 A | | 5/1995 | Coates |
| 5,517,115 A | | 5/1996 | Prammer |
| 5,523,731 A | * | 6/1996 | Leupold ............... G01R 33/383 29/607 |
| 5,557,200 A | | 9/1996 | Coates |
| 5,557,201 A | | 9/1996 | Kleinberg et al. |
| 5,629,626 A | | 5/1997 | Russell et al. |
| 5,696,448 A | | 12/1997 | Coates et al. |
| 5,705,927 A | | 1/1998 | Sezginer et al. |
| 5,757,186 A | * | 5/1998 | Taicher ................ G01N 24/081 324/303 |
| 5,914,598 A | | 6/1999 | Sezginer et al. |
| 5,936,405 A | | 8/1999 | Prammer et al. |
| 6,005,389 A | | 12/1999 | Prammer |
| 6,023,164 A | | 2/2000 | Prammer |
| 6,051,973 A | | 4/2000 | Prammer |
| 6,069,479 A | * | 5/2000 | Taicher ................ G01N 24/081 324/309 |
| 6,107,796 A | | 8/2000 | Prammer |
| 6,111,408 A | | 8/2000 | Blades et al. |
| 6,133,734 A | * | 10/2000 | McKeon ............... G01N 24/081 324/303 |
| 6,242,913 B1 | | 6/2001 | Prammer |
| 6,255,819 B1 | | 7/2001 | Day et al. |
| 6,268,726 B1 | | 7/2001 | Prammer et al. |
| 6,320,488 B1 | * | 11/2001 | Leupold ............... G01R 33/383 335/306 |
| 6,362,619 B2 | | 3/2002 | Prammer et al. |
| 6,400,149 B1 | * | 6/2002 | Luong .................. G01V 3/32 324/303 |
| 6,489,763 B1 | | 12/2002 | Goswami et al. |
| 6,512,371 B2 | | 1/2003 | Prammer |
| 6,525,534 B2 | | 2/2003 | Akkurt et al. |
| 6,531,868 B2 | | 3/2003 | Prammer |
| 6,541,969 B2 | | 4/2003 | Sigal et al. |
| 6,577,125 B2 | | 6/2003 | Prammer et al. |
| 6,646,437 B1 | | 11/2003 | Chitale et al. |
| 6,717,404 B2 | | 4/2004 | Prammer |
| 6,819,108 B2 | | 11/2004 | Huang |
| 7,463,027 B2 | | 12/2008 | Prammer et al. |
| 7,733,086 B2 | | 6/2010 | Prammer et al. |
| 8,358,190 B1 | * | 1/2013 | Hoff ..................... H01F 7/0278 335/306 |
| 8,421,454 B2 | * | 4/2013 | Prammer ..................... 324/300 |
| 9,316,515 B2 | * | 4/2016 | Pors ...................... G01F 1/588 |
| 2001/0043066 A1 | * | 11/2001 | Hawkes ................. G01V 3/32 324/303 |
| 2003/0085702 A1 | | 5/2003 | Freed et al. |
| 2003/0197506 A1 | | 10/2003 | Song et al. |
| 2005/0030021 A1 | * | 2/2005 | Prammer ............... G01V 3/32 324/303 |
| 2008/0174309 A1 | * | 7/2008 | Pusiol ..................... G01F 1/56 324/306 |
| 2009/0102478 A1 | * | 4/2009 | Reiderman ............ G01V 3/32 324/303 |
| 2010/0182004 A1 | * | 7/2010 | Prammer .............. G01R 33/34 324/303 |
| 2012/0098630 A1 | * | 4/2012 | Sakellariou ......... G01R 33/307 335/302 |
| 2013/0174667 A1 | * | 7/2013 | Pors ...................... G01F 1/716 73/861.04 |

FOREIGN PATENT DOCUMENTS

| | | |
|---|---|---|
| GB | 1345848 | 2/1974 |
| WO | WO-2012/170014 | 12/2012 |

OTHER PUBLICATIONS

PCT International Preliminary Report on Patentability, dated Aug. 29, 2013, Appl No. PCT/US2011/039503, "Rotational Indexing to Optimize Sensing Volume of a Nuclear Magnetic Resonance Logging Tool", filed Jun. 7, 2011, 20 pgs.

* cited by examiner

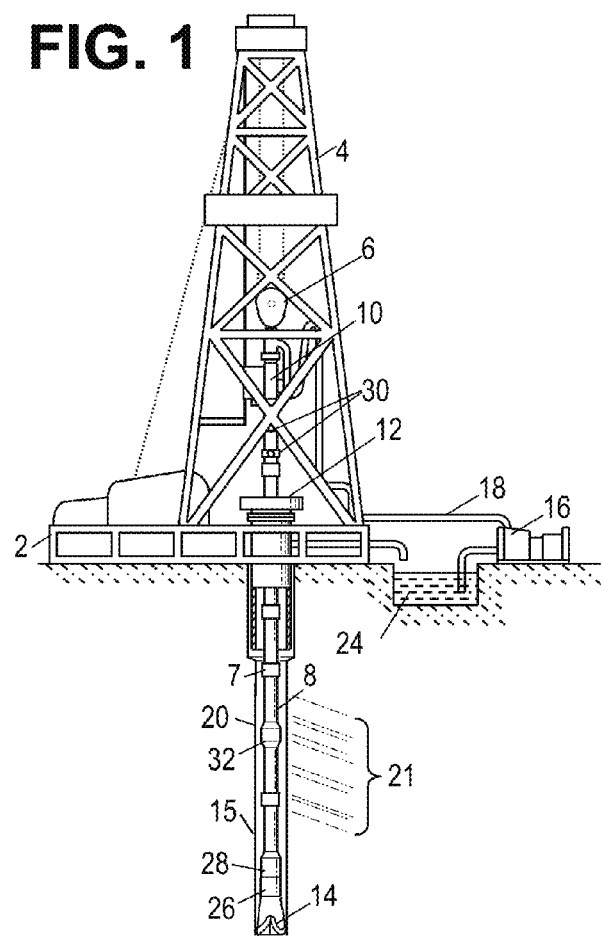
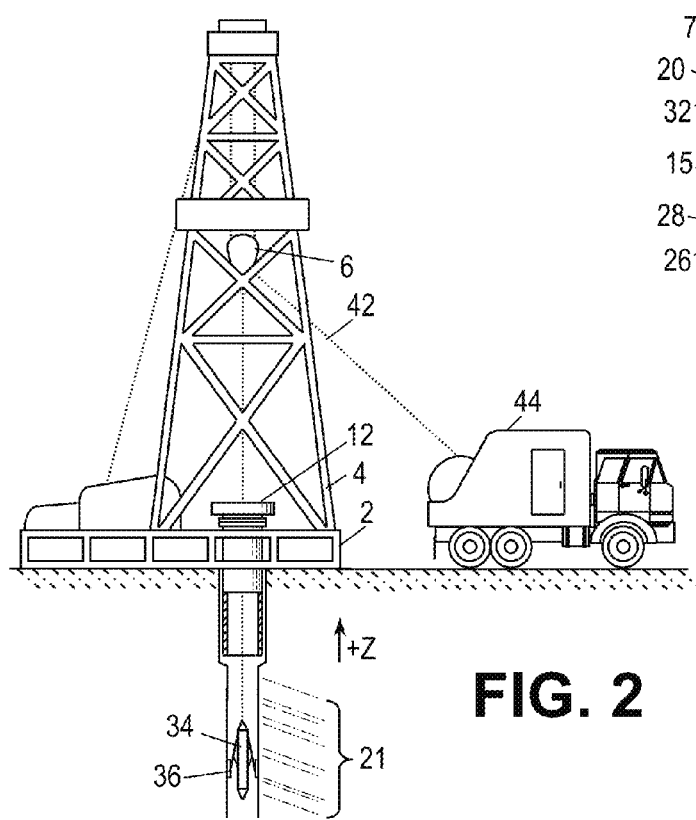

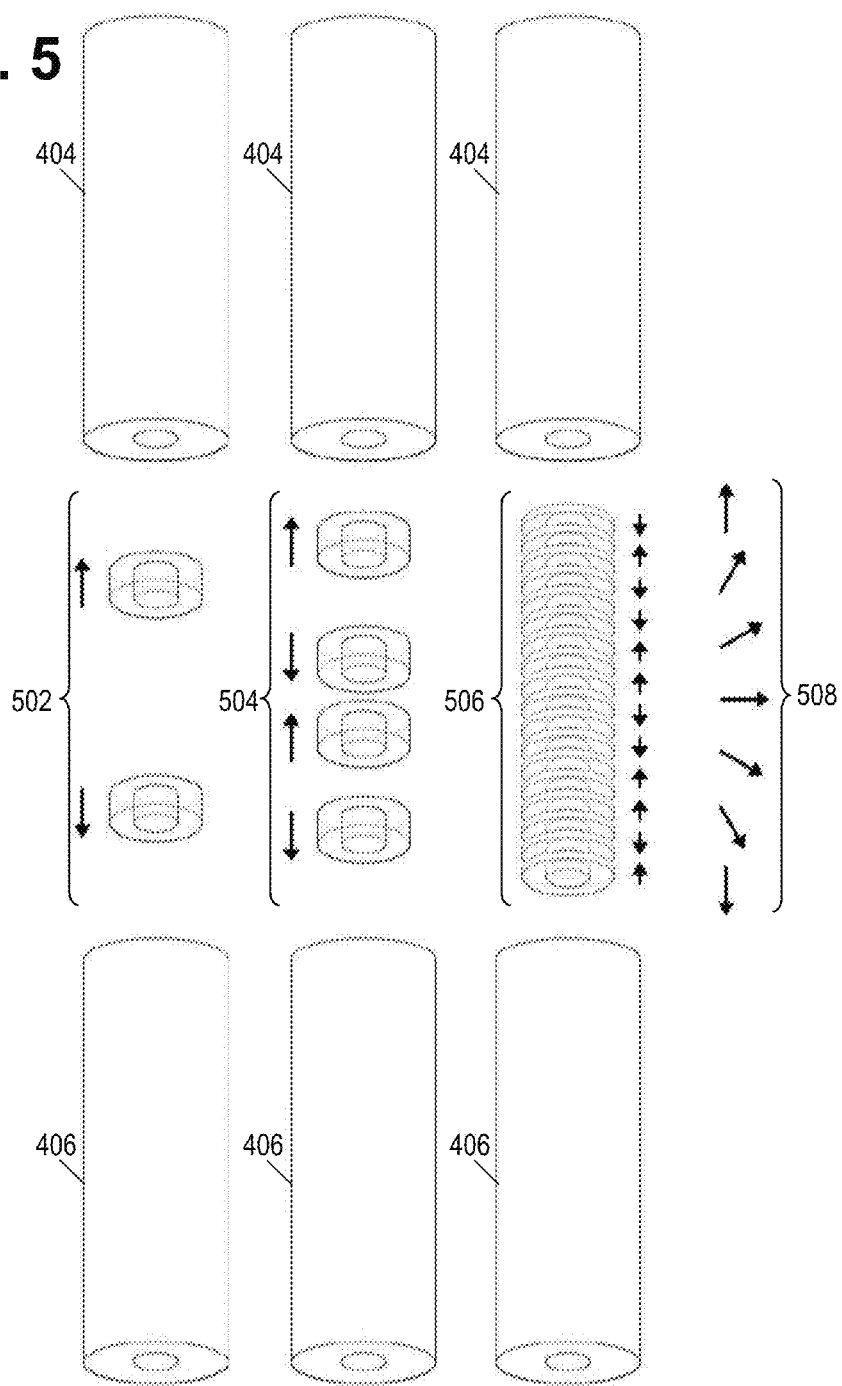

US 9,562,989 B2

ROTATIONAL INDEXING TO OPTIMIZE SENSING VOLUME OF A NUCLEAR MAGNETIC RESONANCE LOGGING TOOL

BACKGROUND

Modern oil field operators demand access to a great variety of information regarding the parameters and conditions encountered downhole. Such information typically includes characteristics of the earth formations traversed by the borehole and the process of collecting such information is commonly referred to as "logging". Logging can be performed by several methods including wireline logging, tubing-conveyed logging, and "logging while drilling" (LWD).

In wireline logging, a sonde is lowered into the borehole after some or all of the well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

Tubing-conveyed logging is similar to wireline logging, but the sonde is mounted on the end of a tubing string. The rigid nature of the tubing string enables the tubing-conveyed sonde to travel where it would be difficult to send a wireline sonde, e.g., along horizontal or upwardly-inclined sections of the borehole. The tubing string can include embedded conductors in the tubing wall for transporting power and telemetry, or a wireline cable can be fed through the interior of the tubing string, or the sonde can simply store data in memory for later retrieval when the sonde returns to the surface.

In LWD, the drilling assembly includes sensing instruments that measure various parameters as the formation is being drilled. LWD enables measurements of the formation while it is less affected by fluid invasion. While LWD measurements are desirable, drilling operations create an environment that is generally hostile to electronic instrumentation, telemetry, and sensor operations.

One of the instruments that has been employed in each of these environments is a nuclear magnetic resonance (NMR) logging tool. A brief synopsis of the operational principles behind NMR tools is provided at the end of this specification, but for the moment it is sufficient to recognize that as part of their operation, NMR tools employ an arrangement of permanent magnets to establish a strong magnetic field in some designated sensing volume. Commonly, for downhole logging, the permanent magnets are desired to create a strong magnetic field and have minimal change in elevated temperatures.

Permanent magnets are generally manufactured from a loose powder. The loose powder is ground into fine particles, which are then pressed and sintered in the presence of a magnetic field. A molding or machining process determines the final shape of the magnets. Inaccuracies in this process cause the field of the permanent magnet to deviate by as much as a degree from the desired field orientation. The deviation may stem from various possible causes including uneven cooling and machining tolerances.

One known approach to improving the performance of NMR logging tools is to increase the sensing volume to improve the signal to noise ratio. An increase of volume is inherent to a lower gradient field. This "low gradient" approach to NMR logging can be particularly sensitive to the field deviations of the permanent magnets.

DESCRIPTION OF THE DRAWINGS

A better understanding of the various disclosed embodiments can be obtained when the following detailed description is considered in conjunction with the following drawings, in which:

FIG. 1 shows an illustrative environment for logging while drilling ("LWD");

FIG. 2 shows an illustrative environment for wireline logging;

FIG. 5 is an exploded view of an illustrative magnet arrangement;

Figure 3:
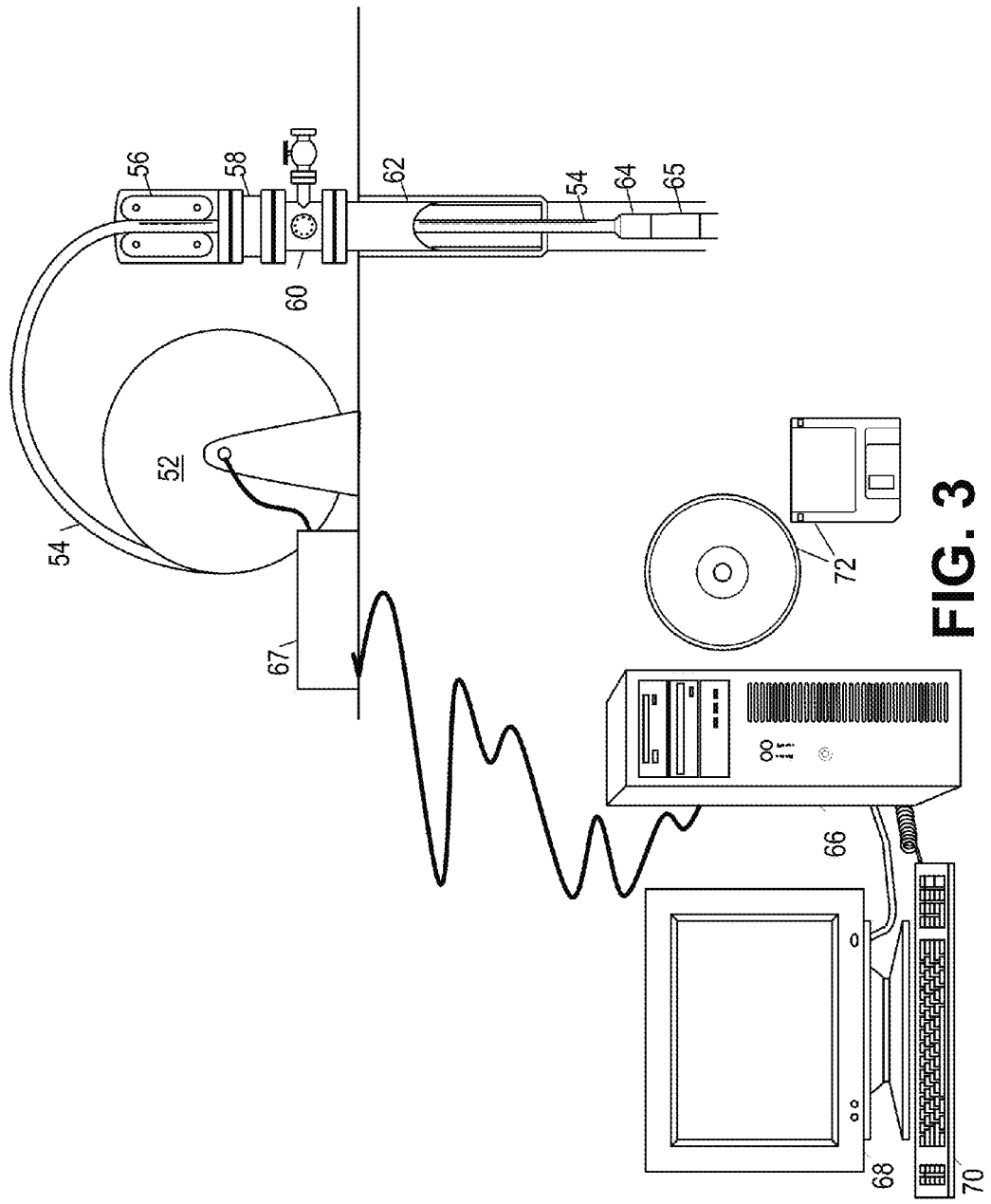
FIG. 3 shows an illustrative environment for tubing-conveyed logging.

It should be understood that the drawings and detailed description thereto are illustrative and do not limit the disclosure to the particular illustrated embodiments, but rather they provide the foundation for all modifications, equivalents and alternatives falling within the scope of the appended claims.

DETAILED DESCRIPTION

Accordingly, there is disclosed herein a nuclear magnetic resonance (NMR) logging tool assembly method that employs rotational indexing to optimize the sensing volume. At least some embodiments of the method include establishing an initial arrangement of the permanent magnets and marking each magnet to indicate their relative rotational orientations in the initial arrangement. Thereafter a series of magnetic field measurements and individual magnet rotations are performed to improve the uniformity of the magnetic field in the sensing volume. Once a satisfactory arrangement has been found, the magnets may be secured together and an antenna array installed along with the electronics for performing relaxation time measurements. The tool may be packaged as a wireline sonde, a tubing-conveyed logging tool, or a logging while drilling (LWD) tool.

Thus at least some of the disclosed NMR logging tool embodiments include an arrangement of permanent magnets that generates a static magnetic field (B0) in the formation around a borehole. Each of the magnets is magnetized with a substantially azimuthal symmetry, meaning that there is a relatively small amount of variation in the magnetic field as the magnet is rotated about its longitudinal axis. By rotationally orienting each magnet relative to the others the effect of any deviations from a perfectly azimuthally symmetric magnetic field may be minimized. The tool further includes one or more antennas attached to the tool body and circuitry that drives the one or more antennas to produce a radio frequency field (B1) and measure a signal response as NMR relaxation occurs in the formation. The tool can be employed to generate logs of relaxation times or properties that can be derived therefrom, such as porosity, permeability, pore size, fluid types, diffusivity, etc.

The disclosed systems and methods are best understood in the context of a suitable usage environment. Accordingly, FIG. 1 shows an illustrative logging (LWD) environment. A drilling platform 2 supports a derrick 4 having a traveling block 6 for raising and lowering a drill string 8. A top drive 10 supports and rotates the drill string 8 as the string is lowered through a well head 12. The drill string's rotation (and/or a downhole mot drives a drill bit 14 to extend the borehole 15 through subsurface earth formations 21. Mud recirculation equipment 16 draws drilling fluid from a retention pit 24 and pumps it through a feed pipe 18 to top drive 10, through the interior of drill string 8 to the drill bit 14, through orifices in drill bit, through the annulus around drill string 8 to a blowout preventer at the surface, and through a discharge pipe into the pit 24. The drilling fluid transports cuttings from the borehole into the pit 24 and aids in maintaining the borehole integrity.

A NMR logging tool 26 is integrated into the bottom-hole assembly near the bit 14. The NMR logging tool 26 may take the form of a drill collar, i.e., a thick-walled tubular that provides weight and rigidity to aid the drilling process. As the bit extends the borehole through the formations, the NMR logging tool collects measurements relating to spin relaxation time ($T_1$, $T_2$, and/or $T_2^*$) distributions as a function of depth or position in the borehole. Other tools and sensors can also be included in the bottomhole assembly to gather measurements of various drilling parameters such as position, orientation, weight-on-bit, borehole diameter, etc. Control/telemetry module 28 collects data from the various bottomhole assembly instruments (including position and orientation information) and stores them in internal memory, which may be able to store hundreds of hours of data. Selected portions of the data can be communicated to surface receivers 30 by, e.g., mud pulse telemetry. Other logging-while drilling telemetry methods also exist and could be employed. For example, electromagnetic telemetry or through-wall acoustic telemetry can be employed with an optional repeater 32 to extend the telemetry range. Most telemetry systems also enable commands to be communicated from the surface to the control and telemetry module to configure the operation of the tools.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. The wireline logging tool 34 may have pads 36 and/or centralizing springs to maintain the tool near the axis of the borehole as the tool is pulled uphole. As explained further below, tool 34 can include an NMR logging instrument that collects relaxation time distribution measurements. A logging facility 44 collects measurements from the logging tool 34, and includes a computer system for processing and storing the measurements gathered by the logging tool.

An alternative logging technique, is tubing-conveyed logging. FIG. 3 shows an illustrative coil tubing logging system in which coil tubing 54 is pulled from a spool 52 by a tubing injector 56 and injected into a well through a packer 58 and a blowout preventer 60 into the 62. In the well, a supervisory sub 64 and one or more logging tools 65 are coupled to the coil tubing 54 and configured to communicate to a surface computer system 66 via information conduits or other telemetry channels. An uphole interface 67 may be provided to exchange communications with the supervisory sub and receive data to be conveyed to the surface computer system 66.

Surface computer system 66 is configured to communicate with supervisory sub 64 to set logging parameters and collect logging information from the one or more logging tools 65 such as an NMR logging tool. Surface computer system 66 is preferably configured by software (shown in FIG. 3 in the form of removable storage media 72) to monitor and control downhole instruments 64, 65. System 66 includes a display device 68 and a user-input device 70 to enable a human operator to interact with the system control software 72.

In each of the foregoing logging environments the logging tool assemblies preferably include a navigational sensor package that includes direction sensors for determining inclination angle, the horizontal angle, and the rotational angle (a.k.a. "tool face angle") of the bottom hole assembly. As is commonly defined in the art, the inclination angle is the deviation from vertically downward, the horizontal angle is the angle in a horizontal plane from true North, and the tool face angle is the orientation (rotational about the tool axis) angle from the high side of the wellbore. In accordance with known techniques, wellbore directional measurements can be made as follows: a three axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the bottom hole assembly can be determined. Additionally, a three axis magnetometer measures the earth's magnetic field vector in a similar manner. From the combined magnetometer and accelerometer data, the horizontal angle of the bottom hole assembly may be determined. A motion sensing unit can also be included to track the position of the tool. In many cases, the motion sensing unit can derive the position information from the direction sensors.

Figure 4:
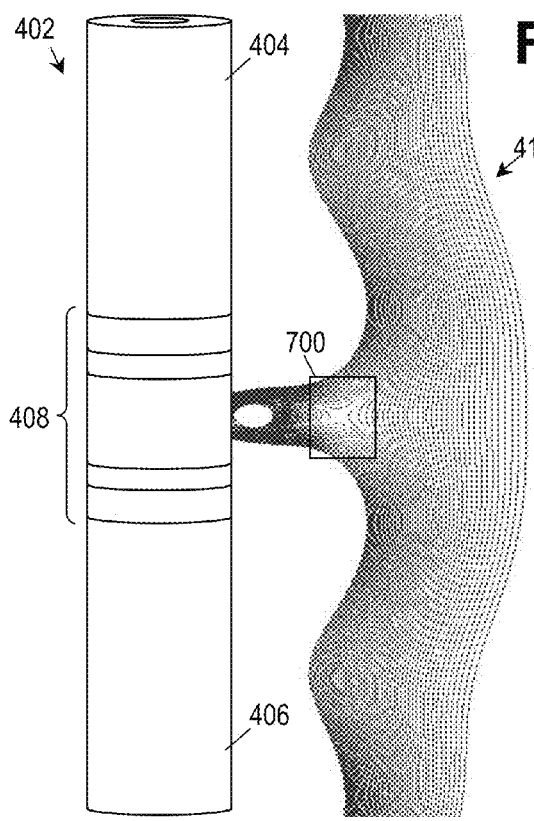
FIG. 4 shows an illustrative nuclear magnetic resonance (NMR) logging tool.

FIG. 4 shows a side view of an illustrative NMR logging tool 402, without its external shell. Tool 402 includes an arrangement of permanent magnets to provide an azimuthally-symmetric static field $B_0$ (shown in cross-section by contour lines 410). Two of the permanent magnets 404, 406 can be seen in FIG. 4. (The rest of the magnets 502 can be seen in one of the exploded views of FIG. 5.) The magnets may be arranged with like poles together, i.e., north to north and south to south. Such an arrangement creates a relatively large sensing volume. That portion of the static field having an appropriate strength for NMR measurements can be found within zone 700, but of course the measurements also require the use of a radio frequency field ($B_1$) perpendicular to the static field. To conduct the NMR measurements, the tool can employ coaxial, solenoidal, frame, or any other kind of antenna in any number in region 408 to induce in zone 700 magnetic field lines that are primarily perpendicular to the static magnetic Permeable materials may be employed to enhance sensitivity of the antennas as well as for favorably shaping field lines. Such permeable materials would typically be positioned directly underneath the antenna.

FIG. 5 shows exploded views of illustrative magnet arrangements for azimuthally symmetric NMR tool designs. An even number of axially-magnetized magnets 502, 504, or 506 can be positioned with like-poles adjacent to each other to create and shape a suitable sensing region in the formation around the borehole. The exact sizes and strengths of the magnets are parameters that can be optimized for the particular tool application. The magnets are not limited to having axial magnetizations. For example, the magnetizations may progress as indicated by arrows 508 from purely axial to purely radial and back to purely axial, with the magnetic fields created by the individual magnets still being substantially azimuthally symmetric.

Figure 6:
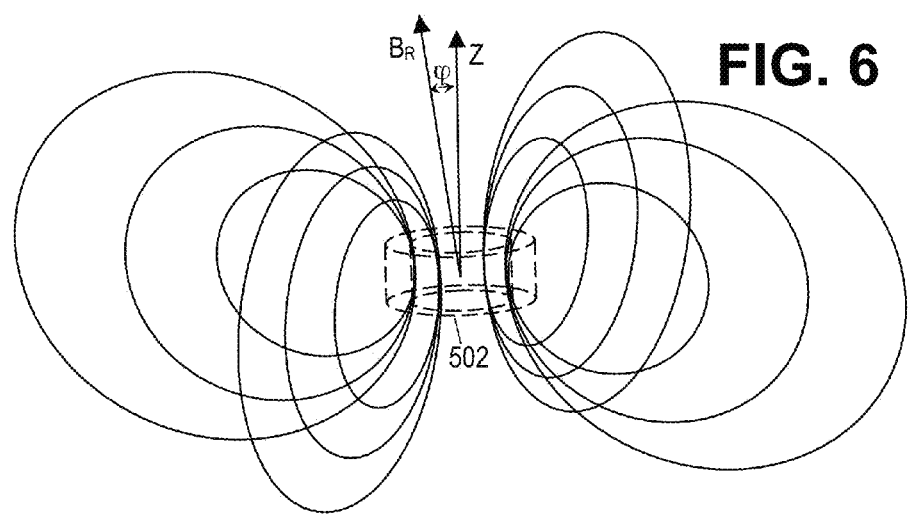
FIG. 6 shows an illustrative field from an individual magnet.

Because it employs an azimuthally symmetric sensing region, the illustrated NMR tool design is not only suitable for use in wireline or tubing-conveyed logging environment, but also in a LWD environment where the tool rotates with the drillstring. The azimuthal symmetry prevents the tool's rotation from introducing any discrepancy between the volume excited by RF pulses and the volume in which subsequent signal measurements occur. Unfortunately, the field may lack true azimuthal symmetry due to limitations in the manufacturing process for the permanent magnets. As indicated in FIG. 6, the magnetization axis of magnet 602 may not be fully aligned with the tool axis, and due to imperfections in the magnet there may be other deviations of the magnet's field from that of an ideal magnet.

Figure 7A:
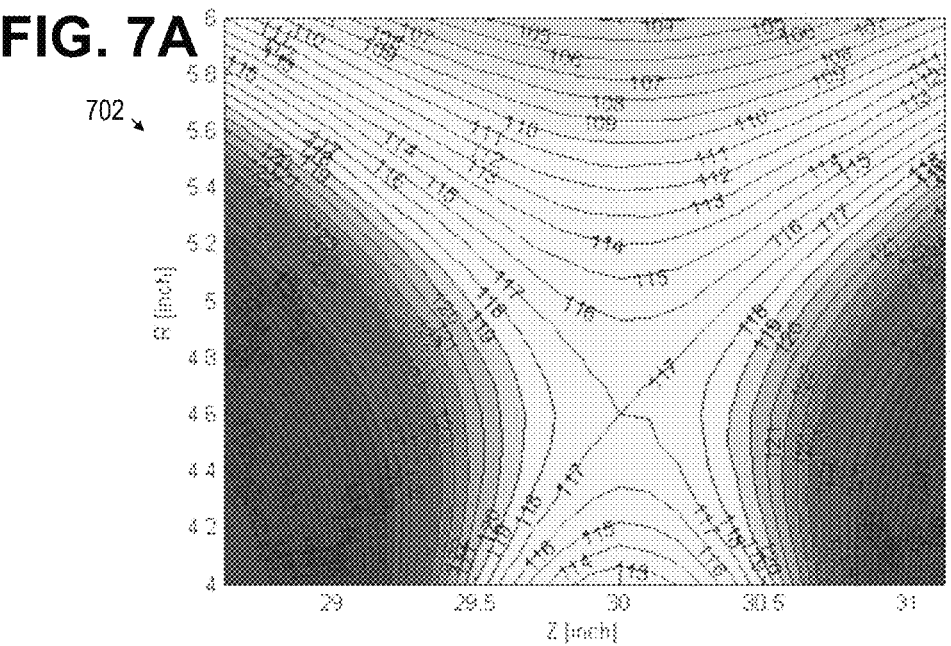
FIGS. 7A-7B show contour lines of illustrative sensing regions.
Figure 7B:
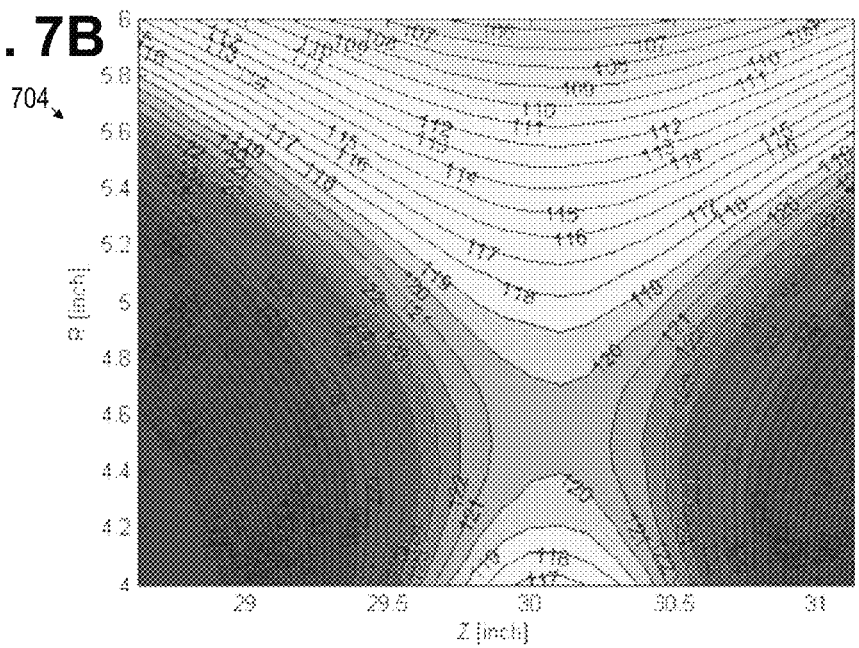

FIG. 7A illustrates the effect of such imperfections. Zone 702 is an enlarged view of zone 700 in FIG. 4. The contour lines indicate that the field in the sensing region is somewhat less than ideal. However, with the use of rotational indexing, the situation is greatly improved as indicated in FIG. 7B. Zone 704 is an enlarged view of zone 700 (FIG. 4) after rotational indexing has been employed to minimize the effects of misaligned magnetizations.

Figure 8:
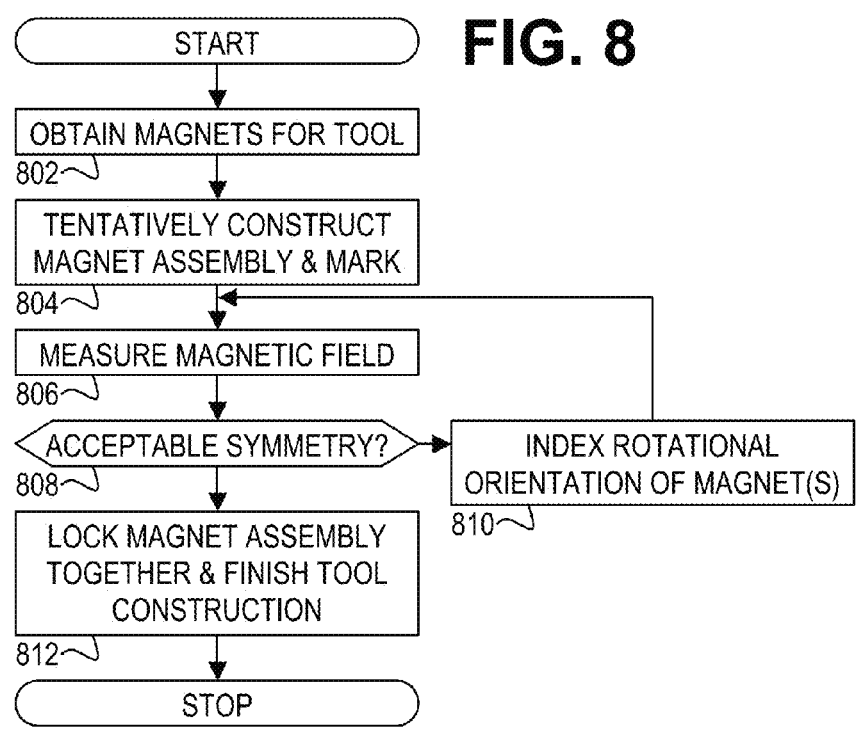
FIG. 8 is a flow diagram of an illustrative NMR logging tool manufacturing method.

FIG. 8 shows an illustrative manufacturing procedure for an NMR tool. In block 802, the manufacturer obtains the magnets for the tool. These magnets may take the form of axially magnetized samarium cobalt magnets, though this procedure can be applied to any arrangement having one or more magnets with azmuthally symmetric magnetizations. Because this procedure provides tolerance for magnetization misalignment and other imperfections, the manufacturer may be able to relax alignment tolerances in favor of stronger magnetizations to further improve tool performance.

In block 804, the manufacturer determines a tentative assembly arrangement for the magnets and marks the magnets accordingly. For example, the manufacturer may scribe a line along the length of the magnet assembly. One of the magnets is designated as a reference so that its scribe line can serve as a rotational orientation reference for the remaining magnets. In block 806 the manufacturer scans the static field created by the magnet assembly and determines one or more properties such as symmetry of the sensitive volume and magnetic field uniformity within the sensitive volume. A variety of ways to determine a measure of uniformity and symmetry exist. One illustrative method for measuring uniformity begins by finding the average radial field in the sensing volume V:

$$H_r = \frac{1}{V}\int_V \hat{r} \cdot \dot{H}(\theta, r, z) dV \quad (1)$$

where $\hat{r}$ is a unit vector in the radial direction and $\dot{H}(\theta,r,z)$ is the magnetic field expressed in cylindrical coordinates relative to the tool axis. Uniformity can then be expressed using a root mean square value:

$$U = \left[\frac{1}{V}\int_V \left\|\dot{H}(\theta, r, z) - \hat{r} H_r\right\|^2 dV\right]^{0.5}, \quad (2)$$

where a value of U=0 corresponds to perfect radial field uniformity.

One illustrative method for measuring symmetry employs a semblance measurement such as:

$$S = \int_Z \int_R \left\|\int_C [\hat{\theta} \times \dot{H}(\theta, r, z)] d\theta\right\|^2 dr dz / 2\pi \int_V \left\|\hat{\theta} \times \dot{H}(\theta, r, z)\right\|^2 dV \quad (3)$$

where $\hat{\theta}$ is the angular unit vector (which is perpendicular to the z-axis and the radial unit vector). In the denominator, the squared magnitude of the cross-product of the angular unit vector and the measured field is integrated over the sensing volume V. In the numerator, the cross-product is integrated over the angular circumference before the squared magnitude is determined. The radial and axial coordinate integrations follow to cover the entire sensing volume V. To the extent that the field is angularly consistent, the numerator and denominator are approximately equal and the semblance S approaches one. To the extent that the field is angularly inconsistent, the inconsistencies inflate the denominator more than the numerator, causing the semblance to fall towards zero.

In block 808, the engineer determines whether the field has acceptable properties, e.g., adequate symmetry and uniformity in the sensing volume as required by the tool specifications to ensure a reasonable signal to noise. In some method embodiments the field may be considered acceptable only if the symmetry has been maximized, if the uniformity has been optimized, or if some defined function of the two has been optimized. In other method embodiments, the determined values may be compared to predetermined thresholds and deemed adequate if the comparisons are favorable.

If the field is not yet acceptable, the manufacturer rotates one of magnets in block 810 and blocks 806-810 are repeated until an acceptable field has been achieved. The manufacturer may employ a variety of rotational indexing strategies to obtain the desired field. One strategy simply employs a systematic shift of the rotational orientations of each magnet, finishing a complete rotation of a given magnet before incrementing the rotation of the next one in line. Another strategy determines the magnet whose rotation has the biggest effect on the field and finds the optimum position of that magnet before adjusting the rest in order of their effect size.

Once an optimal or at least acceptable field has been obtained, the manufacturer secures the magnets together in block 812 to prevent relative motion or relative rotation. The securing process can employ glue, keys, friction clamping, and/or other locking mechanisms. The assembly of the antennas, tool electronics, seals, covers, and other tool construction steps can then proceed.

The foregoing disclosure provides a technique that can be used to improve tool performance and/or to relax vendor tolerances for the tool's individual magnets. The relaxation of tolerances enables the use of a eider range of vendors and magnet manufacturing styles which can increase field strength or reduce manufacturing costs. It is expected that this technique will provide reduced manufacturing costs while still enabling improved measurement signal-to-noise ratios.

Numerous variations and modifications will become apparent to those skilled in the art once the above disclosure is fully appreciated. For example, the disclosed NMR tools employ magnets with magnetizations that are substantially axial, but it is expected that the disclosed techniques are readily applicable to tools having one or more magnets with magnetizations of any kind that are substantially azimuthally symmetric. While the descriptions are primarily directed to methods of manufacture, one of ordinary skill would recognize that they could be employed for tuning or reconditioning existing tools. It is intended that the following claims be interpreted to embrace all such variations and modifications.

Brief synopsis of operating principles behind NMR. NMR tools operate by using an imposed static magnetic field, $B_0$, to split the energy levels of nuclei with non-zero nuclear spin (non-zero angular momentum). Since lower energy levels are preferred, an ensemble of nuclei will exhibit an anisotropic distribution of energy states, giving the nuclear spins a preferential polarization parallel to the imposed field. This polarization state creates a net magnetic moment, thereby producing a bulk magnetization. The nuclei (mostly from hydrogen in well logging experiments) converge upon their equilibrium alignment with a characteristic exponential relaxation lime constant. When this convergence occurs after the nuclei have been placed in a cooperative initial state (discussed below), it is known as recovery. The time constant for recovery is called the "spin-lattice" or "longitudinal" relaxation time $T_1$.

During or after the polarization period, the tool applies a perturbing field, usually in the form of a radio frequency electromagnetic pulse whose relevant magnetic component, $B_1$, is perpendicular to the static field $B_0$. This perturbing field rotates the orientation of the magnetization into the transverse plane, which is perpendicular to the static field $B_0$. The frequency of the pulse can be chosen to target specific volume regions based on chosen frequency. The polarized nuclei are perturbed simultaneously and, when the perturbation ends, they precess around the static magnetic field gradually re-polarizing to align with the static field once again while losing coherence in the transverse plane ($T_2$ relaxation). The precessing nuclei generate a detectable radio frequency signal that can be used to measure statistical distributions of $T_1$, $T_2$, porosities, and/or diffusion constants.

The transverse relaxation time (also called the "spin-spin" relaxation time) represents how quickly the transverse plane magnetization disperses through de-phasing and magnitude loss. Long distance dipolar interactions and diffusion contribute to non-adiabatic, non-reversible, relaxation while those that spread the magnetization like field inhomogeneities contribute to adiabatic, reversible relaxation. The intrinsic transverse time relaxation constant, i.e., relaxation that is solely attributable to non-adiabatic effects (with out diffusion), is labeled as "$T_2$" and it is solely a property of the substance. The time constant for all transverse relaxation processes together (intrinsic and environmental) is labeled as "$T_2^*$".

To isolate the intrinsic $T_2$ subsequent RF pulses can be applied to invert the spin phases and cause the net magnetization to gradually refocus into phase, thus rebuilding the induced signal to create "spin echoes". With each echo the signal peaks (at the time when the nuclei are back in phase), the signal begins to decay again in the same manner as before. Another follow-up pulse can be used to again reverse the instantaneous phases and thereby rebuild the signal again to a subsequent echo. This process does not eliminate the diffusion effect however so fast pulsing is best to approach the true "$T_2^*$".

A sequence of refocusing pulses is known in the art as the Carr-Purcell-Meiboom-Gill (CPMG) pulse sequence. It is most frequently used for measuring $T_2$ distributions. A popular method for measuring $T_1$ distribution employs observing the effect of different recovery time spacings between separate CPMG experiments. Other methods utilizing consecutively spaced RE perturbations followed by a CPMG sequence can also be employed to probe the magnetization build up. As is well known in the industry, the relaxation time distribution information from either $T_2$ or $T_1$ can be readily converted into measurements of porosity (i.e., the relative amount of void space in the formation), hydrocarbon saturation (i.e., the relative percentage of hydrocarbons and water in the formation fluid), and permeability (i.e., the ability of formation fluid to flow from the formation into the well bore). For a more comprehensive overview of the NMR technology including logging methods and various tool designs, the interested reader is directed, for example, to the book by Coates et al. entitled "NMR Logging: Principles and Applications" distributed by Gulf Publishing Company (2000), and hereby incorporated herein by reference for background. Additional description of NMR logging techniques is provided, for example, in U.S. Pat. Nos. 4,710,713; 4,717,876; 4,717,877; 4,717,878; 4,939,648; 5,055,787; 5,212,447; 5,280,243; 5,309,098; 5,412,320; 5,517,115, 5,557,200; 5,696,448; 5,936,405; 6,005,389; 6,023,164; 6,051,973; 6.107.796; 6,111,408; 6,242,913; 6,255,819; 6,268,726; 6,362,619; 6,512,371; 6,525,534; 6,531,868; 6,541,969; 6,577,125; 6,583,62; 6,646,437; 6,717,404; and 7,463,027 which are hereby incorporated herein by reference.

What is claimed is:

1. A nuclear magnetic resonance (NMR) logging tool assembly method that comprises:
    obtaining a set of permanent magnets;
    establishing an initial arrangement of the magnets and marking each magnet to indicate their relative rotational orientations in the initial arrangement;
    determining a total magnetic field established by said arrangement;
    rotating at least one of the magnets relative to the other magnets; and
    repeating said determining and rotating until the uniformity of the total magnetic field is improved.

2. The method of claim 1, further comprising: determining whether adequate uniformity has been achieved and, if so, securing the arrangement of magnets.

3. The method of claim 2, further comprising providing an arrangement of antennas to induce a nuclear magnetic response in a surrounding formation and to measure said nuclear magnetic response.

4. The method of claim 3, further comprising packaging the arrangements of magnets and antennas in a drill collar for use in a logging while drilling environment.

5. The method of claim 3, further comprising packaging the arrangements of magnets and antennas in a wireline sonde.

6. The method of claim 1, wherein said determining includes scanning a volume around the tool with a magnetic field scanner.

7. The method of claim 1, wherein said rotating includes systematically rotating each magnet relative to a first magnet.

8. The method of claim 7, wherein said rotating further includes completing a full rotation with one magnet before varying a rotation position of any other magnets.

9. The method of claim 1, wherein each of the magnets is magnetized substantially along a longitudinal tool axis.

10. The method of claim 1, wherein each of the magnets has a magnetic field that is substantially azimuthally symmetric.

11. A nuclear magnetic resonance (NMR) logging tool that comprises:
- an arrangement of permanent magnets that generates a static magnetic field (B0) in a formation penetrated by a borehole containing said tool, wherein each of said magnets has a magnetic field that is substantially azimuthally symmetric, and wherein said arrangement has the magnets rotationally oriented to minimize an effect of any deviations from azimuthal symmetry of said magnet fields;
- plurality of antennas attached to the tool body; and
- circuitry that drives the antennas to produce a radio frequency field (B1) in said formation,
- wherein the circuitry further measures a signal response from each antenna as NMR relaxation occurs in the formation.

12. The tool of claim 11, wherein the tool is a wireline tool or a tubing-conveyed logging tool.

13. The tool of claim 11, wherein the tool is a logging-while-drilling tool.

14. The tool of claim 11, wherein each of the magnets is polarized substantially along the longitudinal axis of the tool.

15. The tool of claim 14, wherein adjacent magnets have like poles together to provide a sensing region with a low gradient field.

16. The tool of claim 11, further comprising a motion sensing unit that tracks a position of the tool, wherein the circuitry associates said signal responses with borehole positions of the antennas from which the responses were measured.

17. A nuclear magnetic resonance (NMR) logging method that comprises:
- conveying an NMR logging tool through a borehole in a formation, said logging tool having an arrangement of permanent magnets that generates a static magnetic field (B0) in the formation, wherein each of said magnets has a magnetic field that is substantially azimuthally symmetric, and wherein said arrangement has the magnets rotationally oriented to minimize an effect of any deviations from azimuthal symmetry of said magnet fields;
- driving antennas in the NMR logging tool to produce a radio frequency field (B1) in said formation; and
- sensing signal responses from each antenna as NMR relaxation occurs in the formation.

18. The method of claim 17, further comprising:
- deriving relaxation time measurements from the signal responses; and
- displaying as a function of position at least one formation property derived, at least in part, from the relaxation time measurements.

19. The method of claim 17, wherein each of the magnets is polarized substantially along the longitudinal axis of the tool.

20. The method of claim 19, wherein adjacent magnets have like poles together to provide a sensing region with a low gradient field.

* * * * *

UNITED STATES PATENT AND TRADEMARK OFFICE
CERTIFICATE OF CORRECTION

Page 1 of 2

PATENT NO.        : 9,562,989 B2
APPLICATION NO.   : 14/123295
DATED             : February 7, 2017
INVENTOR(S)       : Christopher J. Conrad and Rebecca C. Jachmann It is certified that error appears in the above-identified patent and that said Letters Patent is hereby corrected as shown below:

In the Drawings

Sheet 3, Fig. 6, "     " should be printed as --     --
Sheet 4, Fig. 5, delete

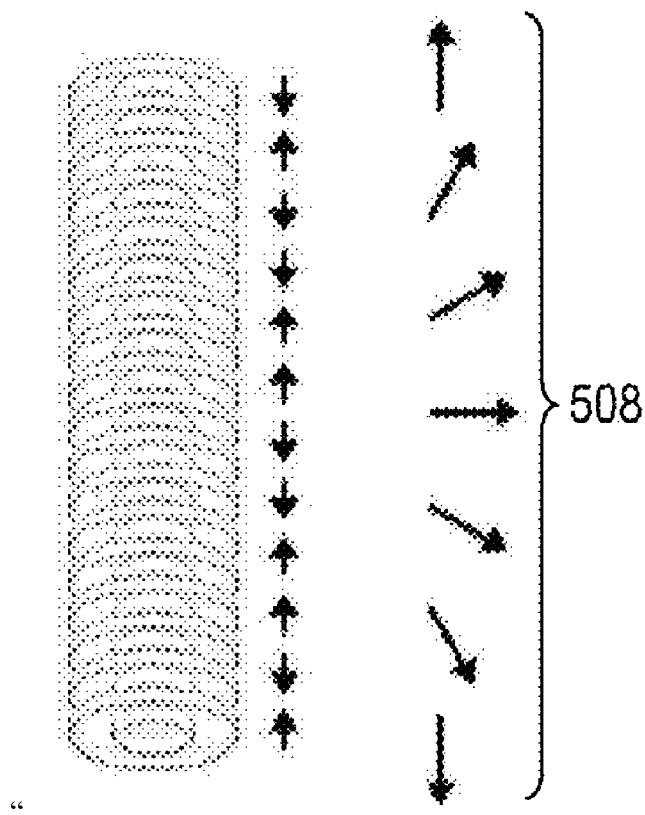

"                                      "

Signed and Sealed this
Fifth Day of September, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,562,989 B2

And insert:

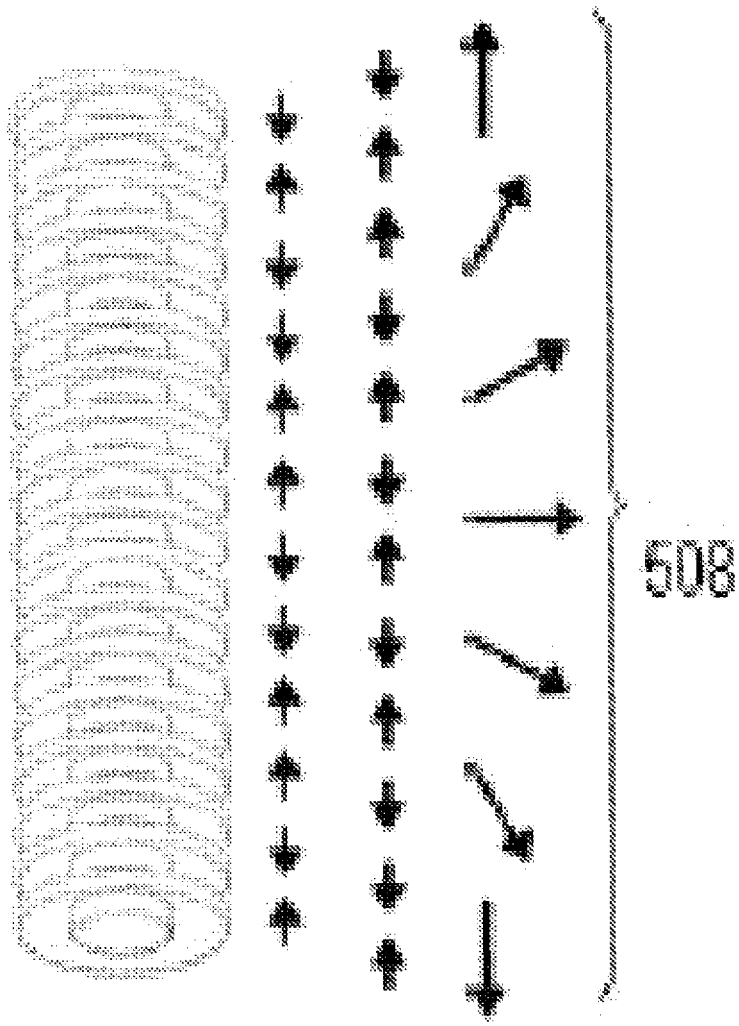

--                                                            --

In the Specification

Column 3, Line 3, the text "logging (LWD)" should read as --logging while drilling (LWD)--; Line 8, the text "(and/or a downhole mot drives" should read as --(and/or a downhole motor) drives--; Line 63, the text "60 into the 62" should read as --60 into the well 62--
Column 5, Line 32, the word "azmuthally" should read as --azimuthally--
Column 6, Line 58, the word "eider" should read as --wider--
Column 7, Line 21, the word "line" should read as --time--
Column 8, Line 4, the text "RE" should read as --RF--